United States Patent [19]

Berry et al.

[11] Patent Number: 4,981,345
[45] Date of Patent: Jan. 1, 1991

[54] SAMPLE HOLDER SUPPORT FOR MICROSCOPES

[75] Inventors: Anthony Berry, Huntsville; Billy H. Nerren, Meridianville, both of Ala.

[73] Assignee: The United States of America as represented by the Administrator of the National Aeronautics and Space Administration, Washington, D.C.

[21] Appl. No.: 523,675

[22] Filed: May 15, 1990

[51] Int. Cl.$^5$ ............... G02B 21/26; G02B 21/32; B25B 11/00
[52] U.S. Cl. ..................... 350/529; 269/21
[58] Field of Search ............... 350/529, 248, 238, 239, 350/507, 532, 536; 269/21, 22

[56] References Cited

U.S. PATENT DOCUMENTS 3,328,022  6/1967  Miller ..................... 269/21
4,744,550  5/1988  Oglesbee ................. 269/21
4,943,148  7/1990  Mondragon et al. ........ 350/529

Primary Examiner—Bruce Y. Arnold
Assistant Examiner—James Phan
Attorney, Agent, or Firm—William J. Sheehan; Jerry L. Seemann; John R. Manning

[57] ABSTRACT

A sample filter holder for use with a microscope for holding the filter in a planar condition on the stage of the microscope so that automatic focusing of the microscope can be performed on particle samples dispersed on the filter. The holder includes a base having a well communicating with an inlet port which is connected to a suction pump. A screen assembly is positioned within the well. The screen assembly includes a disk having a screen positioned on its top surface and secured to the disk at the peripheral edge of the screen. Small bores communicate the outer surface of the screen with the well. The filter is placed on the screen and is held in a flat disposition by the suction forces.

12 Claims, 1 Drawing Sheet

SAMPLE HOLDER SUPPORT FOR MICROSCOPES

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

This invention relates to microscope sample holder supports and more particularly to a support for holding the filter pad on which particulate is to be viewed and focused through a programmed microscope to permit automatic focusing of the particles for analysis and counting.

In the art of microscopic particle analysis the particulate is deposited on a very thin filter pad in the form of a disk or wafer which is placed on a support at the microscope stage and held in place by mechanical rings which are positioned on the edge of the filter pad. Thus, the only portion of the filter pad that is held and maintained flat is the edge of the filter pad. State of the art high quality microscopes used as an image analyzer for particle counting can be programmed to move in three planes and has a limited depth of field automatic focusing capability in the Z-plane. When the microscope focuses on or "sees" a particle, it displays it on a screen where the size and number of particles can be made automatically. However, because of the limited depth of field of the automatic focusing features, if the filter pad on which the particles are carried is not planar, the microscope will not focus properly and thus will not see nor count the particles outside of its depth of field. Because the filter pads of the prior art were merely maintained flat at the peripheral edge, with the edge in focus, substantial portions of the remainder of the filter pads which are outside the focusing range could not be maintained. It has therefore been the practice in the prior art to manually focus the microscope in the Z-plane and manually refocus after the microscope has moved to a different point in the X-Y plane.

SUMMARY OF THE INVENTION

Consequently, it is a primary object of the present invention to provide a filter pad holder for use with a microscope to permit particle analysis to be performed automatically, the particles being dispersed on the filter pad.

It is another object of the present invention to provide a sample holder for microscopes that permit a filter pad on which the samples are dispersed to be held planar so that focusing of the microscope on the samples may be readily performed.

It is a further object of the present invention to provide holding apparatus for supporting a filter pad carrying particles for analysis in a planar disposition for use in a microscope having automatic focusing features used for particle analysis, the apparatus comprising a base carrying a planar screen or plate having apertures on which the filter pad is disposed, the base having means for communicating the screen with a source of sub-atmospheric pressure so that the filter pad is drawn against the screen.

Accordingly, the present invention provides holding apparatus for supporting a sample carrying filter pad in a planar condition on the stage of a microscope, the holding apparatus having a base member adapted to be positioned on the stage and having an inlet port communicating with a well within the base, the well opening at the top of the base for receiving a screen assembly having a planar screen surface which is positioned about the opening of the top. The filter pad is disposed on the screen assembly and the inlet port of the base is connected to a source of sub-atmospheric pressure to draw a suction at the screen and thus the filter pad. The screen includes a plurality of spaced apart apertures so that the suction force on the filter is substantially equally applied across the surface of the filter to draw it against the planar surface of the screen. The filter is thereby maintained flat about its entire surface and the samples carried on the filter are thus in a substantially planar disposition for focusing upon by the microscope for analysis and counting without the need for refocusing at different locations across the filter.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
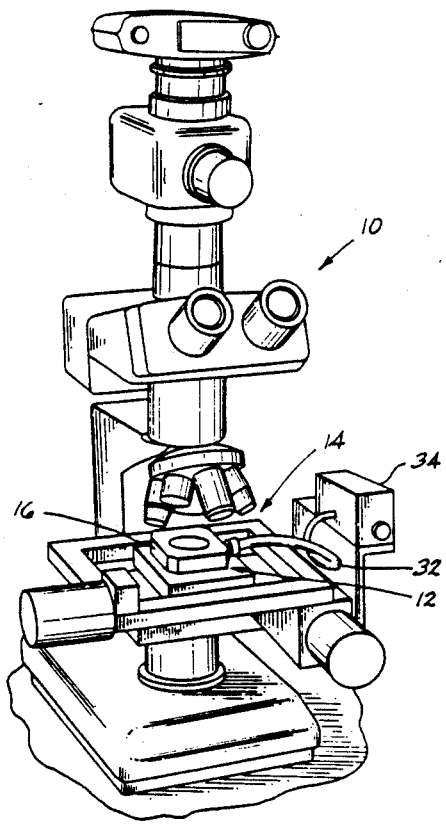
FIG. 1 is a perspective view of a microscope including sample holding apparatus constructed in accordance with the principles of the present invention.
Figure 2:
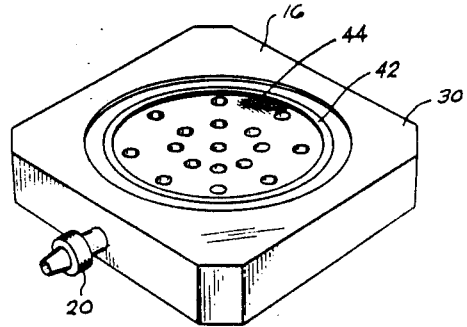
FIG. 2 is a perspective view of the sample holding apparatus illustrated in FIG. 1 at a greatly enlarged scale.
Figure 4:
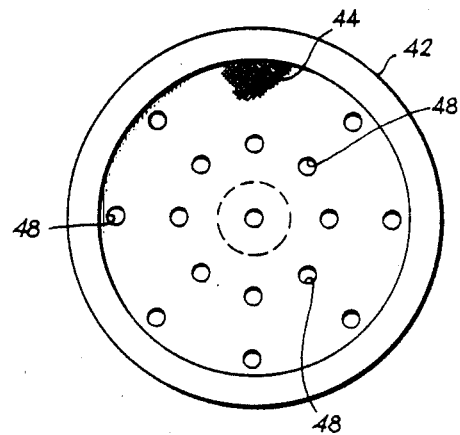
FIG. 4 is a top plan view of the screen assembly of the holding apparatus removed from the base.
Figure 3:
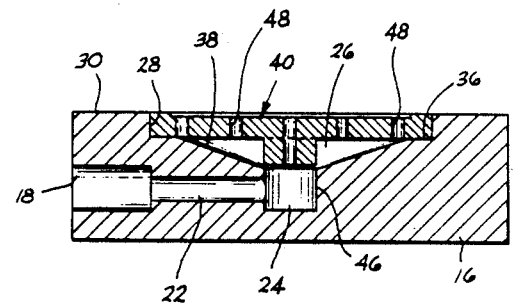
FIG. 3 is a vertical cross sectional view taken through the apparatus of FIG. 2 with the coupling removed.
Figure 5:
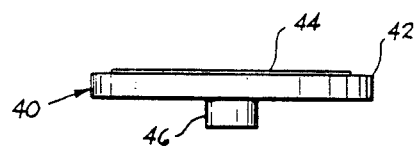
FIG. 5 is an elevational view of the screen assembly.

Referring now to the drawings, FIG. 1 illustrates a microscope 10 which preferably may be of the type which is program driven to move the stage 12 in three planes and can automatically focus in the Z-plane. The microscope per se does not form any part of the present invention and the details thereof are not deemed necessary to the disclosure of the holding apparatus of the present invention, the holding apparatus being generally indicated at 14. The samples, i.e., the particles to be analyzed and counted are disposed conventionally on a filter pad which is a thin disk in the order of 30 microns, the filter pad being constructed of selected material such as acetate, teflon, paper, polyester or other material which is compatible with the liquid solvent in which the particles are suspended so that the liquid may flow through the filter and leave the particles dispersed thereon for sample analysis. As aforesaid, when performing sample analysis and particle counting, unless the particles are disposed in a flat or planar disposition the automatic focusing feature of the microscope is not effective because of the limited depth of field for automatic focus. In the prior art the filter pad holders were annular rings which only held the filter pad flat about the peripheral edge of the filter so that the automatic focusing capability could not be performed and focusing had to be done manually.

To overcome this problem of the prior art, the holding apparatus of the present invention provides a base 16 in the form of a block which may be constructed of any convenient material such as stainless steel, the base having an inlet port 18 which may be threaded internally for receiving a fluid coupling 20. The inlet port 18 communicates through a channel 22 to an annular cavity 24 centrally disposed in the base and which opens onto a well 26 which in turn opens onto and is recessed below a counterbored opening 28 in the upper surface 30 of the base. Thus, the well 26 is in flow communication with the coupling 20. As illustrated in FIG. 1, the coupling is connected to a conduit 32 which in turn is connected to a vacuum pump 34 for drawing a sub-atmospheric pressure or vacuum in the well 26.

Positioned in the counterbore 28 and resting on a ledge 36 at the junction between the counterbore and a conically tapered wall 38 of the well 26 is a screen assembly 40, the screen assembly comprising a disk 42 having a diameter adapted to be received within the counterbore 28 and having a thickness so that when positioned on the ledge 36 it is disposed slightly below the surface 30 of the base 16. A thin wafer 44 of fine screening material such as a 0.010 inch thick screen having pore diameters of approximately 0.0039 inch is fastened about its periphery to the upper surface of the disk 42 coaxial with the disk, the screen having a smaller peripheral diameter than the disk. Both the disk 42 and the screen wafer 44 may be of stainless steel and the periphery of the wafer may be silver soldered to the disk. Concentric with the disk 42 at the surface remote from the screen 44 is a small diameter hub 46 which extends therefrom and is received within the well 26 coaxial with the cavity 24. The outside diameter of the hub 46, which is approximately 0.3 inch is slightly smaller than the diameter of the cavity 24 so that there is a small space between the hub and the wall of the cavity. Formed through the screen 44 and the disk 42 are a plurality of spaced apart bores 48, 17 such bores being illustrated including one which extends through the hub 46, and the others being equally divided along two radially spaced apart locations. The diameter of the bores 48 which preferably are formed by drilling is approximately 0.06 inch and all but the one in the hub communicates with the well 26, the bore in the hub communicating directly with the cavity 24.

In use, a filter pad is placed on the upper surface of the screen assembly 40 with substantially the major portion of the filter disposed on the screen wafer 44. A vacuum is then drawn by the pump 34 and the vacuum communicates through the bores 48, some of the vacuum being leaked between the screen wafer 44 and the surface of the disk 42 so that a substantially equalized sub-atmospheric pressure is applied to the underside of the filter through the tiny pores of the screen. Since the screen 44 is planar, the filter is pulled into a substantially planar disposition so that when the microscope 10 is focused on a particle disposed on the filter, the remaining particles will be within the depth of the field capabilities for the automatic focusing features of the microscope thereby overcoming the difficulties encountered in the prior art.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A sample filter holder for use with a microscope so that the filter can be maintained in a substantially flat disposition, said holder comprising a base having a well formed therein, an inlet port communicating with said well, a screen assembly having a substantially planar filter support surface positioned in said well with said surface disposed for receiving a filter thereon, said assembly including flow passage means communicating said surface with said well, and means for connecting said inlet port to a source of suction for drawing said filter against said surface.

2. A filter holder as recited in claim 1, wherein said flow passage means comprises bores extending through said screen assembly and communicating with said well.

3. A filter holder as recited in claim 1, wherein said base has an upper surface, a peripheral ledge formed in said well recessed below said upper surface, said screen assembly including a disk positioned on said ledge, and a hub disposed in said well.

4. A filter holder as recited in claim 3, wherein said assembly includes a screen having a peripheral edge, said screen being disposed on said disk and secured thereto at said peripheral edge.

5. A filter holder as recited in claim 4, wherein said flow passage means comprises bores extending through said screen and said disk and communicating with said well.

6. A filter holder as recited in claim 5, wherein said flow passage means further comprises at least one bore extending through said hub.

7. In combination with a microscope for analyzing samples dispersed on a filter at the stage of the microscope, a holder for supporting said filter in a substantially planar disposition, said holder comprising a base having a well formed therein, an inlet port communicating with said well, a screen assembly having a substantially planar filter support surface positioned in said well with said surface disposed for receiving a filter thereon, said assembly including flow passage means communicating said surface with said well, and means for connecting said inlet port to a source of suction for drawing said filter against said surface.

8. The combination as recited in claim 7, wherein said flow passage means comprises bores extending through said screen assembly and communicating with said well.

9. The combination as recited in claim 7, wherein said base has an upper surface, a peripheral ledge formed in said well recessed below said upper surface, said screen assembly including a disk positioned on said ledge, and a hub disposed in said well.

10. The combination as recited in claim 9, wherein said assembly includes a screen having a peripheral edge, said screen being disposed on said disk and secured thereto at said peripheral edge.

11. The combination as recited in claim 10, wherein said flow passage means comprises bores extending through said screen and said disk and communicating with said well.

12. The combination as recited in claim 11, wherein said flow passage means further comprises at least one bore extending through said hub.

* * * * *